United States Patent
Chen et al.

(10) Patent No.: US 9,288,369 B2
(45) Date of Patent: Mar. 15, 2016

(54) DISPLACEMENT ESTIMATION METHOD AND DISPLACEMENT ESTIMATION DEVICE USING THE SAME

(75) Inventors: Hsin Chia Chen, Hsin-Chu (TW); Tzung Min Su, Hsin-Chu (TW); Sen Huang Huang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 165 days.

(21) Appl. No.: 13/182,701

(22) Filed: Jul. 14, 2011

(65) Prior Publication Data

US 2012/0020529 A1 Jan. 26, 2012

(30) Foreign Application Priority Data

Jul. 23, 2010 (TW) .............................. 99124282 A

(51) Int. Cl.
G06K 9/00 (2006.01)
G09G 5/08 (2006.01)
H04N 5/14 (2006.01)

(52) U.S. Cl.
CPC .................................. H04N 5/145 (2013.01)

(58) Field of Classification Search
None
See application file for complete search history.

(56) References Cited

U.S. PATENT DOCUMENTS

| | | | |
|---|---|---|---|
| 5,717,463 A | 2/1998 | Brailean et al. | |
| 6,057,539 A * | 5/2000 | Zhou et al. | 250/208.1 |
| 7,078,673 B1 * | 7/2006 | Afriat | 250/221 |
| 7,161,582 B2 * | 1/2007 | Bathiche et al. | 345/156 |
| 7,193,203 B1 * | 3/2007 | Mau et al. | 250/221 |
| 7,280,099 B2 * | 10/2007 | Koay et al. | 345/163 |
| 7,525,082 B2 * | 4/2009 | Itagaki | 250/221 |
| 7,688,307 B1 * | 3/2010 | Tsyrganovich | 345/158 |
| 7,800,594 B2 * | 9/2010 | Nakamura et al. | 345/175 |
| 7,876,307 B2 * | 1/2011 | Bieber et al. | 345/166 |
| 8,188,986 B2 * | 5/2012 | Mau et al. | 345/175 |
| 8,217,334 B1 * | 7/2012 | Lang et al. | 250/221 |
| 8,541,727 B1 * | 9/2013 | Xu et al. | 250/205 |
| 8,570,194 B2 * | 10/2013 | DePue et al. | 341/31 |
| 2004/0160411 A1 * | 8/2004 | Yang | 345/156 |
| 2005/0001153 A1 * | 1/2005 | Lauffenburger et al. | 250/221 |
| 2005/0012022 A1 * | 1/2005 | Lin | 250/205 |
| 2005/0031170 A1 * | 2/2005 | Lin | 382/107 |
| 2005/0062720 A1 * | 3/2005 | Rotzoll et al. | 345/166 |
| 2005/0108645 A1 * | 5/2005 | Prentice et al. | 715/722 |
| 2005/0190157 A1 * | 9/2005 | Oliver et al. | 345/166 |
| 2005/0253812 A1 * | 11/2005 | Lin et al. | 345/163 |
| 2006/0055666 A1 * | 3/2006 | Chong et al. | 345/156 |
| 2006/0125794 A1 * | 6/2006 | Afriat | 345/166 |

(Continued)

FOREIGN PATENT DOCUMENTS

| | | |
|---|---|---|
| CN | 1921562 A | 2/2007 |
| CN | 101335042 A | 12/2008 |
| EP | 1860525 B1 | 11/2007 |

*Primary Examiner* — Stephen R Koziol
*Assistant Examiner* — Sean Conner
(74) *Attorney, Agent, or Firm* — Hauptman Ham, LLP

(57) ABSTRACT

The present invention provides a displacement estimation method including the steps of: acquiring an image frame and determining a quality threshold according to a sampling parameter; calculating a quality parameter of the image frame; and comparing the quality parameter and the quality threshold to determine whether to post-process the image frame. In the displacement estimation method of the present invention, the quality threshold can be adjusted dynamically so as to reduce the possibility of outputting error displacement. The present invention further provides a displacement estimation device.

16 Claims, 4 Drawing Sheets

(56) References Cited

U.S. PATENT DOCUMENTS

| | | | |
|---|---|---|---|
| 2006/0132443 A1* | 6/2006 | Chien Wu | 345/166 |
| 2006/0164393 A1* | 7/2006 | Wu et al. | 345/163 |
| 2006/0187208 A1* | 8/2006 | Wenstrand et al. | 345/166 |
| 2007/0154069 A1* | 7/2007 | Chen et al. | 382/107 |
| 2007/0291002 A1* | 12/2007 | Yao et al. | 345/166 |
| 2008/0199051 A1* | 8/2008 | Seo | 382/107 |
| 2008/0266251 A1* | 10/2008 | Chao et al. | 345/157 |
| 2009/0160774 A1* | 6/2009 | Lee et al. | 345/166 |
| 2009/0195503 A1* | 8/2009 | Lee et al. | 345/166 |
| 2009/0207259 A1* | 8/2009 | Ito et al. | 348/208.4 |
| 2010/0088652 A1* | 4/2010 | Ramsay et al. | 715/857 |
| 2010/0103107 A1* | 4/2010 | Chao et al. | 345/166 |
| 2010/0289745 A1* | 11/2010 | Lye et al. | 345/166 |
| 2011/0025604 A1* | 2/2011 | Chang | 345/166 |
| 2011/0291924 A1* | 12/2011 | Raynor | 345/157 |
| 2011/0293147 A1* | 12/2011 | Utsumi et al. | 382/107 |
| 2011/0310018 A1* | 12/2011 | Song et al. | 345/166 |
| 2012/0127076 A1* | 5/2012 | Song et al. | 345/166 |

* cited by examiner

DISPLACEMENT ESTIMATION METHOD AND DISPLACEMENT ESTIMATION DEVICE USING THE SAME

CROSS REFERENCE TO RELATED APPLICATION

This application claims the priority benefit of Taiwan Patent Application Serial Number 099124282, filed on Jul. 23, 2010, the full disclosure of which is incorporated herein by reference.

BACKGROUND

1. Field of the Invention

This invention generally relates to a displacement estimation method and, more particularly, to a displacement estimation method capable of dynamically adjusting the quality threshold of an image frame and a displacement estimation device using the same.

2. Description of the Related Art

An optical displacement estimation device utilizes a plurality of images acquired by an image sensor to estimate a displacement of the displacement estimation device with respect to a working surface. Conventionally, the displacement can be calculated by, for example, the correlation between images.

However, the quality of an image acquired by the image sensor can affect the accuracy of the displacement estimated by using the image. Therefore, conventionally an image acquired by the image sensor will be identified firstly to determine whether the image is suitable for displacement estimation, and the displacement will be estimated by using valid images. A method of identifying an image quality generally includes the steps of: comparing a predetermined fixed threshold and a quality parameter obtained according to the content of an image; and if the quality parameter is higher than the fixed threshold, identifying the image as a valid image that is suitable for displacement calculation.

A low image quality is generally due to a high noise level. When an image acquired by the image sensor is identified as an invalid image, the image quality of the image can conventionally be adjusted by changing a sampling parameter. However, the change of the sampling parameter will also change the noise level of the image. Accordingly, if a fixed quality threshold is utilized, an error displacement may still be outputted due to the use of an invalid image for displacement estimation.

Accordingly, a displacement estimation method that can dynamically adjust the quality threshold according to the sampling parameter or the image noise level is required by the field.

SUMMARY

The present invention provides a displacement estimation method and a displacement estimation device using the sane that may dynamically adjust the quality threshold according to the sampling parameter of an image sensing unit thereby reducing the possibility of outputting error displacement.

The present invention further provides a displacement estimation method and a displacement estimation device using the same that may dynamically adjust the quality threshold according to the noise level of an image frame acquired by an image sensor thereby increasing the accuracy of displacement estimation.

To achieve the above objects, the present invention provides a displacement estimation method including the steps of: acquiring an image frame with a sampling parameter and determining a predetermined noise level according to the sampling parameter; calculating a quality parameter of the image frame; determining a quality threshold according to the predetermined noise level; and comparing the quality parameter and the quality threshold to determine whether to post-process the image frame.

In an aspect, the predetermined noise level may be derived according to the sampling parameter by theory, or may be actually measured according to an image frame without containing the image of a working surface, e.g. according to an image frame containing the image of a uniformly distributed light source.

The present invention further provides a displacement estimation method including the steps of: acquiring an image frame and determining a quality threshold according to a sampling parameter; calculating a quality parameter of the image frame; and comparing the quality parameter and the quality threshold to determine whether to estimate a displacement according to the image frame and/or whether to output the displacement estimated from the image frame.

In an aspect, the displacement estimation method of the present invention further includes the step of: identifying whether an average brightness of the image frame is within a predetermined range to determine whether to adjust the sampling parameter.

The present invention further provides a displacement estimation device including an image sensing unit configured to acquire and output an image frame with a sampling parameter; and a processing unit for controlling the image sensing unit to acquire the image frame with the sampling parameter, determining a quality threshold according to the sampling parameter, calculating a quality parameter of the image frame and comparing the quality parameter and the quality threshold.

In the displacement estimation method and displacement estimation device of the present invention, the sampling parameter may be an exposure time of an image sensor, an amplification gain of an amplifier and/or a brightness of a light source.

The present invention dynamically adjusts the predetermined noise level or the quality threshold according to different sampling parameters so as to increase the accuracy of identifying valid or invalid image frame and reduce the possibility of outputting error displacement, wherein a relationship between the predetermined noise level or quality threshold and the sampling parameter may be previously constructed as a lookup table or a relational graph to be stored in the processing unit.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
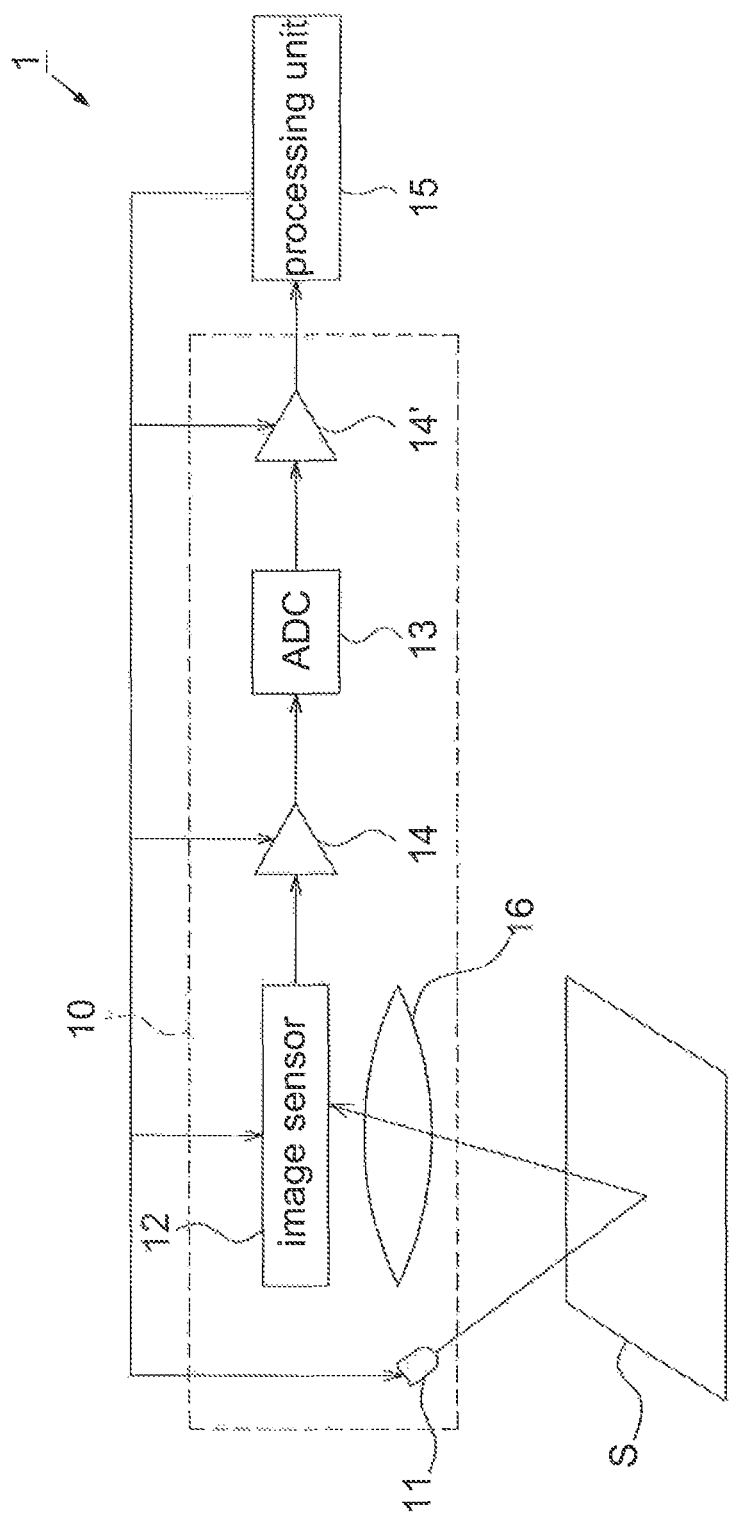
FIG. 1 shows a block diagram of the displacement estimation device according to an embodiment of the present invention.

In the drawings of the present invention, only a part of the components are shown and other components that are not directly pertinent to the present invention are omitted.

Please refer to FIG. 1, it shows a block diagram of the displacement estimation device according to an embodiment of the present invention. The displacement estimation device 1 may be an optical mouse which is put on a working surface S for estimating a displacement with respect to the working surface S, wherein the working surface S may be any suitable surface such as a table surface, the surface of a mouse pad or a paper surface. The displacement estimation device 1 includes an image sensing unit 10 and a processing unit 15. The image sensing unit 10 acquires and outputs an image frame according to a sampling parameter. The processing unit 15 controls the image sensing unit 10 to acquire an image frame of the working surface S according to the sampling parameter, determines a predetermined noise level or a quality threshold according to the sampling parameter, calculates a quality parameter of the image frame, and compares the quality parameter and the quality threshold to determine whether to post-process the image frame, wherein the prost-process may be the calculation of a displacement of the displacement estimation device 1 with respect to the working surface S according to the image frame and/or the determination of whether to output the displacement estimated according to the image frame. In the present invention, the quality parameter may be any parameter used to represent the quality of an image frame.

The image sensing unit 10 includes a light source 11, an image sensor 12, an analog-to-digital converter (ADC) 13, an analog amplifier 14 and/or a digital amplifier 14'. Initially, the light source 11 illuminates the working surface S with a predetermined brightness for providing the light required by the image sensor 12 during acquiring image frames. The light source 11 may be a light emitting diode, a laser diode or other suitable light sources. The image sensor 12 receives reflected lights from the working surface S with a predetermined exposure time to generate analog image frames. The image sensor 12 may be a CCD image sensor, a CMOS image sensor or other suitable image sensors. The analog amplifier 14 amplifies the image signal of analog image frames outputted from the image sensor 12 with a predetermined analog amplification gain. In this embodiment, the analog amplifier 14 may or may not be implemented. The analog-to-digital converter 13 is configured to convert the analog image frame to the digital image frame. The digital amplifier 14' amplifies the image signal of digital image frames outputted from the ADC 13 with a predetermined digital amplification gain. In this embodiment, the digital amplifier 14' may or may not be implemented. Therefore, the sampling parameter of the image sensing unit 10 may be the exposure time, the brightness of light source and/or the amplification, but the present invention is not limited thereto. In addition, the image sensing unit 10 may further include a light guiding unit 16 configured to guide the reflected lights from the working surface S to the image sensor 12.

Next, the processing unit 15 automatically controls the light source 11 to illuminate with a brightness according to the digital image frame received, controls the image sensor 12 to acquire the image frame with an exposure time, and controls the analog amplifier 14 or the digital amplifier 14' to amplify the image frame with an amplification gain. The processing unit 15 identifies whether an average brightness of the digital image frame received is within a predetermined range to determine the sampling parameter. For example, a range of the average brightness of a digital image frame may be 0 to 255. When the average brightness of a current image frame is within a predetermined range 108 to 148, the processing unit 15 does not adjust the sampling parameter. When the average brightness of the current image frame falls outside of 108 to 148, the processing unit 15 adjusts the sampling parameter so that the average brightness of the next image frame acquired by the image sensor 12 may fall into the predetermined range. It is appreciated that, the numerical number of the predetermined range above is only exemplary rather than a limitation to the present invention.

However, when the sampling parameter is adjusted, a noise level of the image frame will also be changed. In the present invention, the noise level is a character index representing the image quality.

Figure 2:
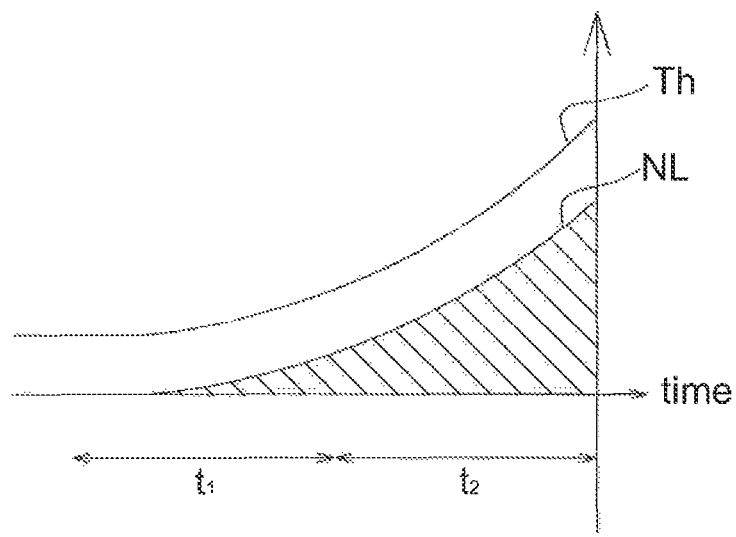
FIG. 2 shows a schematic diagram of adjusting the quality threshold with the noise level in the displacement estimation method according to an embodiment of the present invention.
Figure 3:
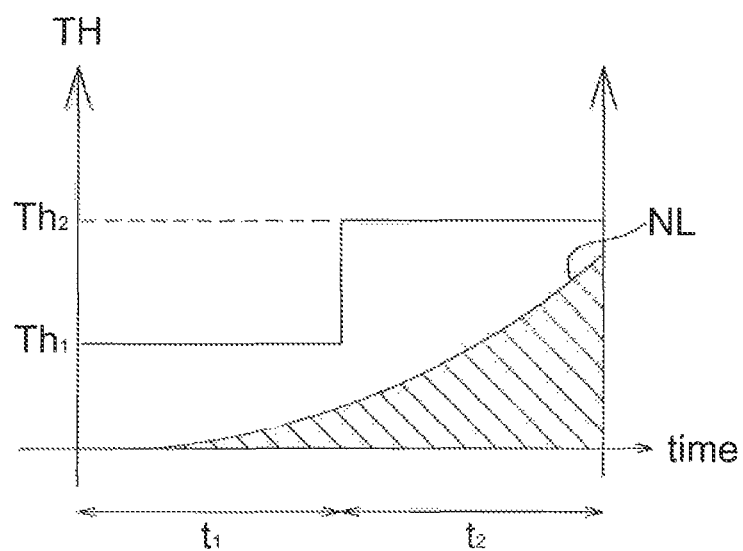
FIG. 3 shows another schematic diagram of adjusting the quality threshold with the noise level in the displacement estimation method according to an embodiment of the present invention.

Please refer to FIGS. 2 and 3, they show schematic diagrams of the variation of noise level in the displacement estimation method according to the embodiment of the present invention. For example, when the average brightness of the image frame received by the processing unit 15 is lower than the predetermined range, the brightness of the light source 11 or the exposure time of the image sensor 12 may be increased first in a time interval $t_1$. When the sampling parameter is gradually increased, the noise level NL in the average brightness of the image frame received by the processing unit 15 is also increased as shown in FIGS. 2 and 3. It is assumed that the processing unit 15 is not able to adjust the average brightness of the image frame into the predetermined range by only adjusting the brightness of the light source 11 and the exposure time of the image sensor 12, thus the amplification gain of the amplifier 14 or 14' is increased in a second time interval $t_2$. Similarly, the noise level NL in the image frame is also increased with the increase of the amplification gain.

The present invention can reduce the possibility of outputting error displacement by means of dynamically adjusting the quality threshold. That is, when the processing unit 15 identifies that the quality parameter of an image frame received is lower than the quality threshold, the image frame is identified as an invalid image frame and it will be ignored. On the contrary, when the processing unit 15 identifies that the quality parameter of an image frame received is higher than the quality threshold, the image frame is identified as a valid image frame and it will be post-processed, e.g. for calculating a displacement by using the valid image frame. The quality parameter and the quality threshold will be illustrated by embodiments below. It is appreciated that, the illustration of post-processing the valid image frame when the quality parameter is higher than the quality threshold is not used to limit the present invention; that is, the valid image frame may possible be post-processed when the quality parameter is lower than the quality threshold after proper numerical processing.

In FIG. 2, the quality threshold Th is set as a multiple or an offset of the noise level NL. In FIG. 3, the quality thresholds Th1 and Th2 respectively associated with a sampling parameter to be adjusted are previously determined; that is, a lookup table or a relational graph of sampling parameters associated with predetermined noise levels or quality thresholds may be constructed previously such that the processing unit 15 may determine the predetermined noise level and the quality threshold according to a current sampling parameter. In addition, the noise level may be obtained previously by theory according to different sampling parameters, or may be actually measured by acquiring image frames without containing the image of the working surface S with the image sensor 12 using different sampling parameters, e.g. acquiring an image frame containing only the image of a uniformly distributed light source. It is appreciated that, the sampling parameters being adjusted described above in the time intervals $t_1$ and $t_2$ shown in FIGS. 2 and 3 are only exemplary, and the processing unit 15 may separately or simultaneously adjust different sampling parameters with other sequences or combinations.

Figure 4:
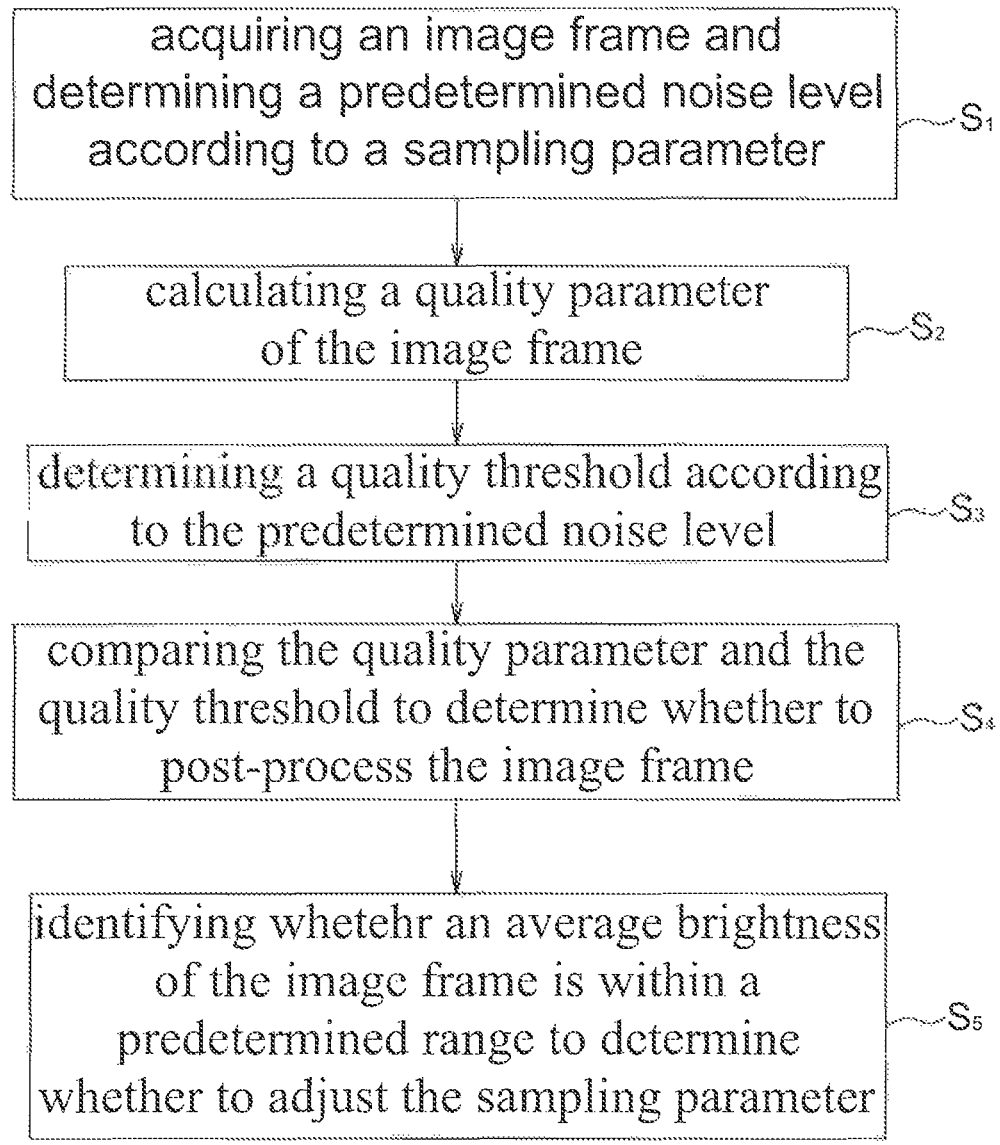
FIG. 4 shows a flow chart of the displacement estimation method according to an embodiment of the present invention.

Please refer to FIG. 4, it shows a flow chart of the displacement estimation method according to an embodiment of the present invention, which includes the steps of: acquiring an image frame with a sampling parameter and determining a predetermined noise level according to the sampling parameter (Step $S_1$); calculating a quality parameter of the image frame (Step $S_2$); determining a quality threshold according to the predetermined noise level (Step $S_3$); comparing the quality parameter and the quality threshold to determine whether to post-process the image frame (Step $S_4$); and identifying whether an average brightness of the image frame is within a predetermined range to determine whether to adjust the sampling parameter (Step $S_5$).

In addition to the implementation of the displacement estimation method according to the present invention mentioned above, an embodiment of the image quality will be provided hereinafter. And the embodiment herein is only for illustration rather than a limitation to the present invention.

Figure 5:
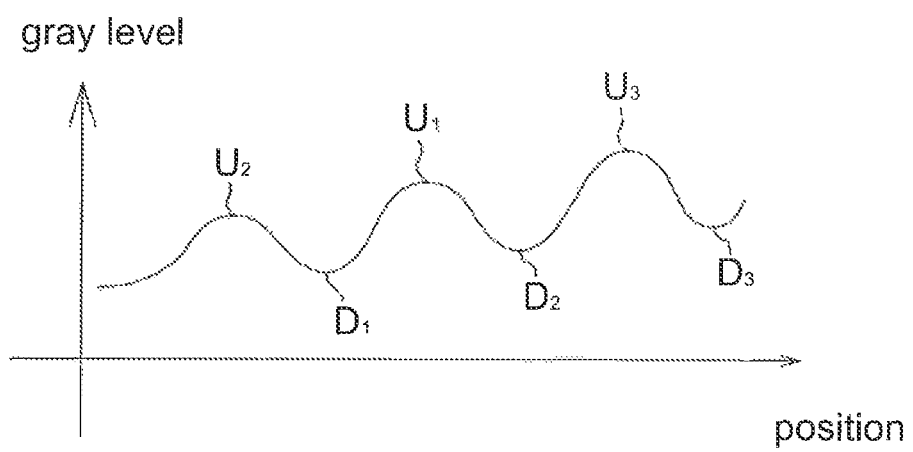
FIG. 5 shows a schematic diagram of a kind of quality parameter used in the displacement estimation method according to the embodiment of the present invention.

Please refer to FIG. 5, it shows a schematic diagram of an image quality parameter used in the displacement estimation method according to the embodiment of the present invention. An image characteristic variation may be, for example, a gray level variation of one-dimensional pixels of an image frame acquired by the image sensing unit 10, and the quality parameter may be set as, for example, a peak number of the gray level variation of the one-dimensional pixels. For example, it is assumed that in one row or one column of pixels of an image frame, when gray levels of two adjacent pixels of a specific pixel are lower than the gray level of the specific pixel to an extent, the specific pixel is identified as an upper peak. On the contrary, when gray levels of two adjacent pixels of a specific pixel are higher than the gray level of the specific pixel to an extent, the specific pixel is identified as a lower peak. For example in FIG. 5 there are three upper peaks $U_1$ to $U_3$ and three lower peaks $D_1$ to $D_3$. The image quality may be, for example, a number of upper peaks, lower peaks and/or a total number of the upper and lower peaks, and the total number of peaks is 6 herein. In the image frame acquired by the image sensing unit 10, a higher peak number means that the characteristic variation of the image frame is more apparent and the image frame is more possible to be identified as a valid image frame. Therefore, the quality of an image frame may be represented by different peak numbers. In addition, the quality parameter of the present invention may also be other character parameters and is not limited to that shown in FIG. 5. Some embodiments of the quality parameter may be referred to commonly owned U.S. Pat. Nos. 7,142,695, 7,444, 006 and 7,116,801, or referred to published papers by Y. S. Chen and F. C. Meng, "Image quality measurement based on statistics of activity regions," Journal of the Chinese Institute of Engineers, Vol. 24, No. 3, pp. 379-388 (2001) or by N. Zhang, A. E. Vladar, M. T. Postek, and B. Larrabee, "A kurtosis-based statistical measure for two-dimensional processes and its application to image sharpness," Proceedings of Section of Physical and Engineering Sciences of American Statistical Society, pp. 4730-4736, 2003.

Please refer to FIGS. 4 and 5 together, the displacement estimation method of the present invention will be illustrated by using a total peak number as the image quality parameter. At first, the processing unit 15 controls the image sensing unit 10 to acquire an image frame with a (or a group of) sampling parameter (e.g. exposure time, brightness of light source and/or amplification gain) and determines a predetermined noise level according to the sampling parameter. At this moment the predetermined noise level may be a predetermined total peak number 5 (Step $S_1$). Next, the processing unit 15 calculates a quality parameter of the image frame, i.e. calculating a total peak number of the image frame (Step $S_2$). Next, the processing unit 15 determines a quality threshold according to the predetermined noise level. For example, the quality threshold may be set as a ratio or an offset of the predetermined total peak number, e.g. set as 10 by multiplying a number of 2 or set as 8 by adding a number of 3 (Step $S_3$). Then, the processing unit 15 compares the quality parameter and the quality threshold to determine whether to post-process the image frame (Step $S_4$). When the quality parameter is larger than the quality threshold, the image frame will be post-processed. When the quality parameter is smaller than the quality threshold, the image frame will be ignored. In another embodiment, when a comparison result of comparing the quality parameter and the quality threshold shows that the image frame is a valid image frame, the image frame will be post-processed. When a comparison result of comparing the quality parameter and the quality threshold shows that the image frame is an invalid image frame, the image frame will be ignored.

At last, the processing unit 15 identifies whether an average brightness of the image frame is within a predetermined range to determine whether to adjust the sampling parameter. For example, when an average brightness of the image frame is within a predetermined range, the processing unit 15 controls the image sensing unit 10 maintains the same sampling parameter during acquiring the next image frame. When an average brightness of the image frame falls outside of the predetermined range, the processing unit 15 controls the image sensing unit 10 to use a new (or a group of new) sampling parameter to acquire the next image frame (Step $S_5$).

In addition, when it is a relationship between the sampling parameter and the quality threshold being stored in the processing unit 15, the displacement estimation method according to another embodiment of the present invention includes the steps of: acquiring an image frame and determining a quality threshold according to a sampling parameter; calculating a quality parameter of the image frame; and comparing the quality parameter and the quality threshold to determine whether to estimate a displacement according to the image frame or whether to output the displacement.

As mentioned above, as the conventional displacement estimation method determines the quality of acquired image frames according to a fixed quality threshold, it still has the problem of possibly outputting error displacement. The present invention further provides a displacement estimation method that can dynamically adjust the quality threshold according to the predetermined noise level or sampling parameter, or can adjust the quality threshold according to a relationship between the sampling parameter and the predetermined noise level or quality threshold constructed previously so as to significantly increase the calculation accuracy of displacement.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A displacement estimation method for a displacement estimation device on a working surface, the estimation device comprising an amplifier and an image sensor, the method comprising:
   acquiring an image frame of the working surface with sampling parameters, wherein the sampling parameters comprise an amplification gain of the amplifier and an exposure time of the image sensor;
   determining a number of peaks according to the sampling parameters by referring to a lookup table which stores a previously constructed relationship between the sampling parameters and the number of peaks, wherein the sampling parameters in the previously constructed relationship include values of the amplification gain and the exposure time, wherein the previously constructed relationship is obtained by acquiring test image frames with the image sensor while varying the sampling parameters, and wherein the test image frames include an image of a uniformly distributed light source and do not contain an image of any working surface;
   calculating a total number of peaks of the image frame, wherein a peak is a pixel having a gray level larger or smaller than, by a predetermined value, gray levels of two adjacent pixels thereof in a same row or a same column of the image frame;
   setting a quality threshold directly as a ratio or an offset of the determined number of peaks, wherein the quality threshold is larger than the determined number of peaks;
   comparing the total number of peaks and the quality threshold;
   when the total number of peaks is larger than the quality threshold, estimating a displacement of the displacement estimation device based on the image frame; and
   when the total number of peaks is smaller than the quality threshold, ignoring the image frame.

2. The displacement estimation method as claimed in claim 1, wherein the sampling parameters further comprise a brightness of light source.

3. The displacement estimation method as claimed in claim 1, further comprising:
   calculating an average brightness of the image frame;
   maintaining the sampling parameters when the average brightness is within a predetermined range; and
   adjusting the sampling parameters when the average brightness is outside of the predetermined range.

4. The displacement estimation method as claimed in claim 1, further comprising:
   post-processing the image frame when a comparison result of the comparing the total number of peaks and the quality threshold shows that the image frame is a valid image frame; and
   ignoring the image frame when the comparison result shows that the image frame is an invalid image frame.

5. A displacement estimation method for a displacement estimation device on a working surface, the estimation device comprising an amplifier and an image sensor, the method comprising:
   acquiring an image frame of the working surface and determining a number of peaks according to sampling parameters by referring to a lookup table which stores a previously constructed relationship between the sampling parameters and the number of peaks, wherein the sampling parameters comprise an amplification gain of the amplifier and an exposure time of the image sensor, and the sampling parameters in the previously constructed relationship include values of the amplification gain and the exposure time, wherein the previously constructed relationship is obtained by acquiring test image frames with the image sensor while varying the sampling parameters, and wherein the test image frames include an image of a uniformly distributed light source and do not contain an image of any working surface;
   setting a quality threshold directly as a ratio or an offset of the determined number of peaks, wherein the quality threshold is larger than the determined number of peaks;
   calculating a total number of peaks of the image frame, wherein a peak is a pixel having a gray level larger or smaller than, by a predetermined value, gray levels of two adjacent pixels thereof in a same row or a same column of the image frame;
   comparing the total number of peaks and the quality threshold;
   when the total number of peaks is larger than the quality threshold, (i) estimating a displacement according to the image frame or (ii) outputting a displacement estimated according to the image frame; and
   when the total number of peaks is smaller than the quality threshold, ignoring the image frame.

6. The displacement estimation method as claimed in claim 5, wherein the sampling parameters further comprise a brightness of light source.

7. The displacement estimation method as claimed in claim 5, further comprising:
   calculating an average brightness of the image frame; and
   identifying whether the average brightness is within a predetermined range to determine whether to adjust the sampling parameters.

8. The displacement estimation method as claimed in claim 5, further comprising:
   estimating the displacement according to the image frame when a comparison result of the comparing the total number of peaks and the quality threshold shows that the image frame is a valid image frame.

9. A displacement estimation device, comprising:
   an image sensing unit configured to acquire and output an image frame of a working surface with sampling parameters, wherein the sampling parameters comprise an amplification gain of an amplifier and an exposure time of an image sensor; and
   a processing unit configured to:
      control the image sensing unit to acquire the image frame with the sampling parameters,
      determine a number of peaks according to the sampling parameters by referring to a lookup table which stores a previously constructed relationship between the sampling parameters and the number of peaks, wherein the sampling parameters in the previously constructed relationship include values of the amplification gain and the exposure time, wherein the previously constructed relationship is obtained by acquiring test image frames with the image sensor while varying the sampling parameters, and wherein the test image frames include an image of a uniformly distributed light source and do not contain an image of any working surface, set a quality threshold directly as a ratio or an offset of the determined number of peaks, wherein the quality threshold is larger than the determined number of peaks, calculate a total number of peaks of the image frame, wherein a peak is a pixel having a gray level larger or smaller than, by a predetermined value, gray levels of two adjacent pixels thereof in a same row or a same column of the image frame, compare the total number of peaks and the quality threshold when the total number of peaks is larger than the quality threshold, estimate a displacement of the displacement estimation device based on the image frame; and when the total number of peaks is smaller than the quality threshold, ignore the image frame.

10. The displacement estimation device as claimed in claim 9, wherein the processing unit is further configured to determine whether to post-process the image frame according to a comparison result of comparing the total number of peaks and the quality threshold.

11. The displacement estimation device as claimed in claim 9, wherein the image sensing unit comprises:

the image sensor configured to acquire the image frame with the exposure time;

a light source configured to provide lights with a brightness when the image sensor is acquiring the image frame; and the amplifier configured to amplifying the image frame with the amplification gain.

12. The displacement estimation device as claimed in claim 11, wherein the sampling parameters further comprise the brightness of the light source.

13. The displacement estimation device as claimed in claim 11, wherein the image sensing unit further comprises:

an analog-to-digital converter configured to convert an analog image frame acquired by the image sensor to a digital image frame; and the amplifier is an analog amplifier or a digital amplifier.

14. The displacement estimation device as claimed in claim 9, wherein the processing unit is further configured to identify whether an average brightness of the image frame is within a predetermined range to determine whether to adjust the sampling parameters.

15. The displacement estimation method as claimed in claim 1, wherein the quality threshold is dynamically set to be larger than the determined number of peaks.

16. The displacement estimation method as claimed in claim 5, wherein the quality threshold is dynamically set to be larger than the determined number of peaks.

* * * * *